F. BAILEY.
DIPPER FOR TURPENTINE CUPS.
APPLICATION FILED MAY 18, 1910.

969,765.

Patented Sept. 13, 1910.

Witnesses:
E. F. Camp
A. R. Walton

Inventor
Fess Bailey

UNITED STATES PATENT OFFICE.

FESS BAILEY, OF WOODVILLE, FLORIDA, ASSIGNOR TO ANGUS J. CONOLY, OF QUITMAN, GEORGIA.

DIPPER FOR TURPENTINE-CUPS.

969,765.  Specification of Letters Patent.  Patented Sept. 13, 1910.

Application filed May 18, 1910.  Serial No. 562,071.

*To all whom it may concern:*

Be it known that I, FESS BAILEY, a citizen of the United States, residing at Woodville, in the county of Leon and State of Florida, have invented certain new and useful Improvements in Dippers for Turpentine-Cups, of which the following is a specification.

My present invention relates generally to dippers, and more particularly to a novel and useful dipper to assist in discharging the contents of turpentine cups, and one which embodies, as a part thereof, means to clean out the lips of a certain type of turpentine cups which engage aprons secured to a tree from which turpentine is to be gathered.

Figure 1:
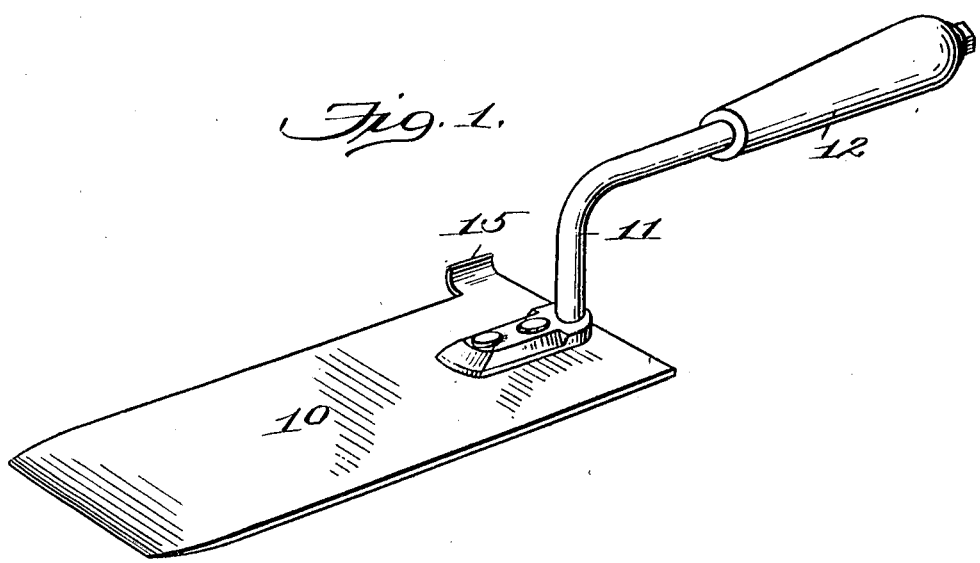
Figure 2:
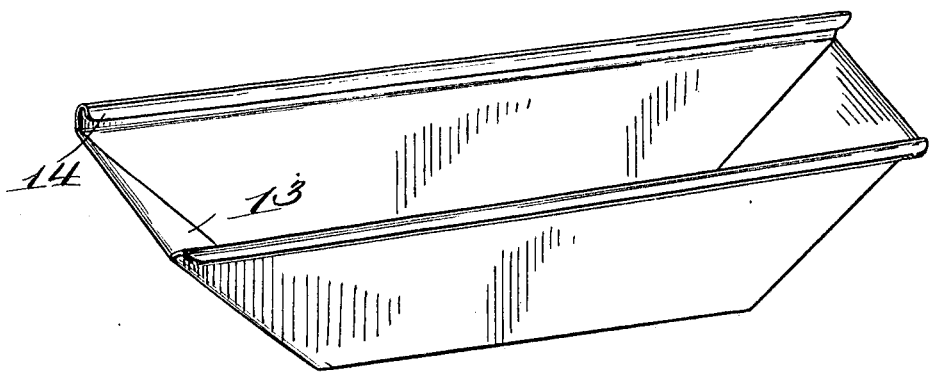

To this end my invention resides in the form of dipper shown in the accompanying drawing, in which, Figure 1 is a perspective view of my dipper, and, Fig. 2 is a similar view of a type of turpentine cup with which it is to be used.

Referring to these figures, my improved dipper comprises a flat blade 10 which tapers toward its forward end although it is of general rectangular form. Adjacent the rear end of this blade is secured the forward end of an upstanding and rearwardly curved handle bar 11, upon the rear end of which is affixed the handle 12. The side edges of this blade thus fit between the sides of the type of turpentine cup shown in Fig. 2, the sides 13 of which taper toward its bottom, one side having an upwardly extending portion provided with an inwardly downturned lip 14 which, in practice, engages an apron affixed to a tree. An objection to this type of turpentine cup has been that its lip 14 becomes gummed and bent so that it will not catch upon the apron, and to this end I provide the blade 10 of my dipper with a projection 15 at one side immediately adjacent its rear end, which projection is bent upwardly and inwardly in a semi-circle so that while it will not interfere with the ordinary function of the dipper it forms an efficient means to engage and slide under the cup lip 14 and straighten and clean-out the same.

I claim:

1. A dipper of the character described comprising a relatively flat blade of rectangular form, tapering toward its forward end to fit cross-wise within a downwardly tapering turpentine cup, and a handle bar secured to, and extending rearwardly from the rear portion of said dipper and having a handle thereon.

2. A turpentine dipper comprising a relatively rectangular blade, to fit cross-wise within a turpentine cup, having a handle, and a projection extending from one side thereof adjacent one end, for the purpose described.

3. A dipper of the character described comprising a relatively flat blade of rectangular form, tapering toward its forward end to fit cross-wise within a downwardly tapering turpentine cup having an apron engaging lip, said blade having a handle and a projection extending from one side adjacent its rear end and bent upwardly and inwardly in a substantial semi-circle.

In testimony whereof I affix my signature in presence of two witnesses.

FESS BAILEY.

Witnesses:
 TROUPE L. PAGE,
 B. F. PAGE.